US009874865B2

(12) United States Patent
Wada et al.

(10) Patent No.: US 9,874,865 B2
(45) Date of Patent: Jan. 23, 2018

(54) CONTROL METHOD AND CONTROL DEVICE

(75) Inventors: Takashi Wada, Hyogo (JP); Yoshiharu Nishida, Hyogo (JP); Shuichi Inada, Kanagawa (JP); Yoshihide Inoue, Kanagawa (JP)

(73) Assignee: Kobe Steel, Ltd., Hyogo (JP)

( * ) Notice: Subject to any disclaimer, the term of this patent is extended or adjusted under 35 U.S.C. 154(b) by 455 days.

(21) Appl. No.: 14/342,337

(22) PCT Filed: Aug. 2, 2012

(86) PCT No.: PCT/JP2012/069645
§ 371 (c)(1),
(2), (4) Date: Feb. 28, 2014

(87) PCT Pub. No.: WO2013/031465
PCT Pub. Date: Mar. 7, 2013

(65) Prior Publication Data
US 2014/0222186 A1 Aug. 7, 2014

(30) Foreign Application Priority Data
Sep. 1, 2011 (JP) .................................. 2011-190637

(51) Int. Cl.
*G05B 19/402* (2006.01)
*B25J 9/16* (2006.01)
*G05B 19/404* (2006.01)

(52) U.S. Cl.
CPC .......... *G05B 19/402* (2013.01); *B25J 9/1641* (2013.01); *G05B 19/404* (2013.01);
(Continued)

(58) Field of Classification Search
CPC ................ G05B 19/402; G05B 19/404; G05B 2219/2609; G05B 2219/41041; B25J 9/1641; Y10S 901/08
(Continued)

(56) References Cited

U.S. PATENT DOCUMENTS 5,059,881 A 10/1991 Fujita et al.
5,204,602 A * 4/1993 Iwashita .............. G05B 19/404
318/561
(Continued)

FOREIGN PATENT DOCUMENTS

JP 02-015311 A 1/1990
JP 03-201106 A 9/1991
(Continued)

OTHER PUBLICATIONS

The extended European search report issued by the European Patent Office dated Jun. 1, 2015, which corresponds to European Patent Application No. 12828034.4-1807 and is related to U.S. Appl. No. 14/342,337.
(Continued)

*Primary Examiner* — Kenneth M Lo
*Assistant Examiner* — Alan Chu
(74) *Attorney, Agent, or Firm* — Studebaker & Brackett PC

(57) ABSTRACT

Provided are a control method and a control device that can make the range of periodic activity (amplitude of reciprocal movement) of an object of control, such as an industrial robot, the same as a case in which the reduction device has no backlash or the same as the amplitude of a position instruction signal. A control device (3) that carries out position control for an arm (5), which carries out periodic movement, while compensating for backlash in the arm (5) is provided with a control unit (15) that adds to a position
(Continued)

instruction signal, which gives instructions for the position of the arm (5), a backlash quantity signal after the backlash quantity signal has been shifted so as to be delayed by a delay time, generates a final position instruction signal, and carries out position control of the arm (5) on the basis of the final position instruction signal that has been generated, said backlash quantity signal compensating for backlash.

8 Claims, 14 Drawing Sheets

(52) U.S. Cl.
CPC ............ *G05B 2219/2609* (2013.01); *G05B 2219/41041* (2013.01); *Y10S 901/08* (2013.01)

(58) Field of Classification Search
USPC ........................................ 700/114
See application file for complete search history.

(56) References Cited

U.S. PATENT DOCUMENTS

| | | | | |
|---|---|---|---|---|
| 5,721,546 | A * | 2/1998 | Tsutsumishita | G01D 5/24409 341/116 |
| 6,252,368 | B1 * | 6/2001 | Sugie | G05B 19/404 318/568.22 |
| 2006/0017415 | A1 | 1/2006 | Kozai et al. | |
| 2009/0107969 | A1 * | 4/2009 | Asai | B23K 9/0953 219/124.1 |
| 2010/0295497 | A1 * | 11/2010 | Takamatsu | H02P 23/0004 318/671 |

FOREIGN PATENT DOCUMENTS

| | | |
|---|---|---|
| JP | 04-135217 A | 5/1992 |
| JP | 2564722 Y2 | 11/1997 |
| JP | 10-268916 A | 10/1998 |
| JP | 2000-250614 A | 9/2000 |
| JP | 2004-234205 A | 8/2004 |

OTHER PUBLICATIONS

Tadokoro S. et al.; "An Experimental Study on Improvement of Weaving Trajectories of Welding Robots by a Learning Scheme"; Nov. 15, 1993; pp. 1500-1505; IEEE; USA.
International Search Report; PCT/JP2012/069645; dated Nov. 6, 2012.
Written Opinion of the International Searching Authority; PCT/JP2012/069645; dated Nov. 6, 2012.
P. Zhang; "Determining of delay time for a heating, ventilating and air conditioning plant based on a neural network"; Industry Control Computer; pp. 12-15; with English language abstract.

* cited by examiner

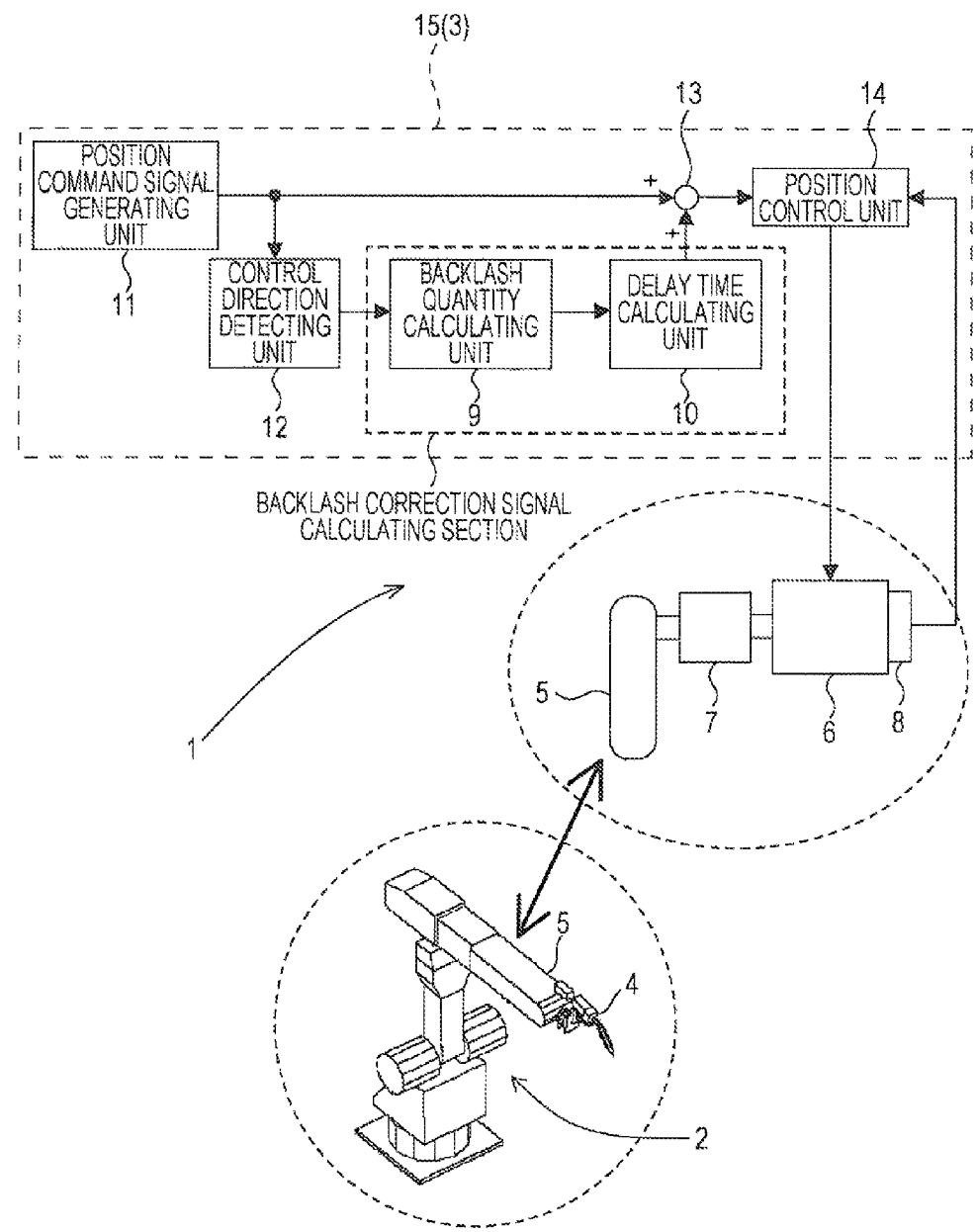

WHEN L IS SMALL

WHEN L IS LARGE

CONTROL METHOD AND CONTROL DEVICE

TECHNICAL FIELD

The present invention relates to a control method and a control device suitable for position control of an industrial robot or the like that includes a motor and a speed reducer.

BACKGROUND ART

For example, a welding robot is a six-axis vertical articulated industrial robot, in which the tip of an arm is provided with a welding tool formed by a welding torch or the like. A joint unit, which is a driving unit of the welding robot, includes a motor serving as a driving source, and a speed reducer configured to transmit a driving force of the motor to the arm. The motor in the joint unit includes a position detector, such as an encoder, that detects the rotational position of the motor.

To the welding robot having the joint unit, a position command signal indicating a rotational position of the motor is given from the outside. Then, the rotation of the motor is controlled such that motor position information detected by the position detector matches a commanded position indicated by the position command signal. The rotation of the motor under such control is transmitted through the speed reducer to the arm, so that the welding torch or the like at the tip of the arm moves to a desired position.

As is well known, a speed reducer formed by combining a plurality of gears has backlash, which contributes to a positional deviation of an arm. An attempt has been made to eliminate the positional deviation of the arm. Specifically, the attempt involves obtaining the amount of backlash in the speed reducer in advance, adding a correction signal for compensating for the amount of backlash to a position command signal so as to generate a position command correction signal, and giving the position command correction signal to the welding robot to eliminate the positional deviation of the arm.

As means of eliminating the positional deviation of the arm, there are techniques disclosed in Patent Literatures (PTLs) 1 and 2 listed below.

PTL 1 discloses a robot control device that includes a position control unit and a backlash correcting unit. The position control unit is a servo mechanism configured to compare a command position signal with a position signal which is an output signal of position detecting means, and perform control such that a tip of an arm is located at a predetermined position specified by the command position signal. After each arm is moved to a predetermined position and a motor rotates by more than or equal to a predetermined amount of backlash in a speed reducer in the same direction as that in positioning for associating the position signal of the position detecting means with the position of the arm, if reversal of the rotation direction of the motor is detected, the backlash correcting unit performs backlash correction which involves adding the amount of correction corresponding to the amount of backlash to the command position signal, and thus eliminates the effect of backlash.

This control device is described as being capable of always performing appropriate backlash correction, and causing the hand tip position of the robot to accurately follow the commanded position.

PTL 2 discloses a numerical control device that includes control direction detecting means for monitoring a position command value for a control object, and detecting a control direction for controlling the control object; correction command value updating means for updating a backlash correction command value depending on the time elapsed after the control direction detected by the control direction detecting means is reversed; and control means for adding the backlash correction command value updated by the correction command value updating means to the position command value, and controlling the rotation of a motor that drives the control object on the basis of the result of the addition.

This numerical control device is described as being capable of compensating for backlash and accurately compensating for elastic deformation that occurs when the direction of movement of the control object is reversed.

CITATION LIST

Patent Literature

PTL 1: Japanese Registered Utility Model No. 2564722
PTL 2: Japanese Unexamined Patent Application Publication No. 2004-2;34205

SUMMARY OF INVENTION

Technical Problem

However, even with the robot control device disclosed in PTL 1, it may be difficult to always perform appropriate backlash correction.

For example, in the case where the arm of the robot is swung from side to side with respect to a weld line in weaving, even when backlash correction (backlash compensation) is performed in accordance with a conventional procedure illustrated in FIG. 2A, it is difficult to eliminate the effect of backlash on the motion of the arm.

A conventional backlash correction will now be described on the basis of FIG. 2A.

When the arm is swung from side to side in weaving, in other words, when a position command signal $\theta_r(t)$ indicating a rotational position of the motor is a periodic signal like a sine wave, the reciprocating motion (in particular, reciprocating reversal) of the arm is delayed in phase from the position command signal $\theta_r(t)$ due to the effect of backlash in the speed reducer. As a result, before the direction of motion of the arm is actually reversed, a control direction indicated by the position command signal $\theta_r(t)$ is reversed. A direction indicated by a stepped backlash quantity signal $\theta_B(t)$ for compensating for the amount of backlash is reversed at peak positions of the position command signal $\theta_r(t)$, that is, at the same time as the time when the control direction of the position command signal $\theta_r(t)$ is reversed. Therefore, a final position command signal $\theta_{Fr}(t)$ is generated by adding, to the position command signal $\theta_r(t)$ whose control direction is reversed before the position where the reciprocating motion of the arm should be reversed, the backlash quantity signal $\theta_B(t)$ whose direction is also reversed before the position where the reciprocating motion of the arm should be reversed. The waveform of the final position command signal $\theta_{Fr}(t)$ shown in FIG. 2A has, at peak positions of the position command signal $\theta_r(t)$, steps caused by the backlash quantity signal $\theta_B(t)$.

When the final position command signal $\theta_{Fr}(t)$ is input to the robot to control the arm, the control direction indicated by the final position command signal $\theta_{Fr}(t)$ is reversed before the position where the reciprocating motion of the arm should be reversed. Therefore, the amplitude of the reciprocating motion of the arm (i.e., a rotation angle $\theta_A(t)$ of the arm) indicated by a solid line is smaller than the amplitude of the original position command signal $\theta_r(t)$ indicated by a broken line. This means that the effect of backlash on the reciprocating motion of the arm cannot be eliminated.

That is, as compared to the case where the speed reducer has no backlash and a position command signal is thus directly input to the robot without addition of a correction signal for compensating for the amount of backlash to the position command signal, the behavioral range (amplitude of reciprocation) of the arm in PTL 1 is smaller.

The numerical control device disclosed in PTL 2 has a transfer function filter. The transfer function filter is obtained by modeling a transfer function from friction acting on the arm to a deviation between the position of the arm and the position of the motor. This filter converts a rectangular-wave backlash quantity signal to a smooth signal.

However, as in PTL 1, if the position command signal is a periodic signal like a sine wave, the reciprocating motion of the arm is delayed in phase from the position command signal. Therefore, before the reciprocating motion of the arm is actually reversed, the position command signal is reversed and the backlash quantity signal is also reversed. Even though the backlash quantity signal is smoothed out by the filter, the amplitude of the reciprocating motion of the arm is smaller than that in the case where the speed reducer has no backlash, as in PTL 1.

In view of the problems described above, the present invention aims to provide a control method and a control device that can make, when a position command signal indicating a position of a control object such as an industrial robot is a periodic signal like a sine wave, the behavioral range (amplitude of reciprocation) of the control object the same as that in the case were a speed reducer has no backlash, or the same as the amplitude of the position command signal.

Solution to Problem

To achieve the object described above, the present invention adopts the following technical means.

A control method according to the present invention is a control method that performs position control of a control object while compensating for backlash in the control object, the control object being configured to move periodically. The control method includes a final position command signal generating step of generating a final position command signal by shifting a backlash quantity signal that compensates for the backlash and adding the backlash quantity signal to a position command signal indicating a position of the control object; and a position control step of performing position control of the control object on the basis of the final position command signal generated in the final position command signal generating step.

Preferably, the final position command signal generating step may include a position command signal generating step of generating the position command signal; a control direction detecting step of detecting, on the basis of the position command signal generated in the position command signal generating step, a control direction for controlling the control object; a backlash quantity calculating step of generating, in accordance with the control direction detected in the control direction detecting step, a backlash quantity signal for compensating for the amount of backlash in the control object; a delay time calculating step of generating a backlash correction signal by delaying, by a predetermined delay time with respect to the position command signal, the backlash quantity signal generated in the backlash quantity calculating step; and a signal adding step of generating a final position command signal by adding the backlash correction signal generated in the delay time calculating step to the position command signal. The position control step may control the position of the control object on the basis of the final position command signal generated in the signal adding step.

Preferably a length of time less than or equal to half a period of the position command signal formed by a periodic signal may be set as the predetermined delay time used in the delay time calculating step.

Preferably, an actual output of the control object driven on the basis of the position command signal formed by a periodic signal may be determined in advance, a phase difference between the position command signal and the actual output may be determined, and the determined phase difference may be set as the predetermined delay time used in the delay time calculating step.

Preferably, a control model obtained by modeling the control object may be prepared; and a model output obtained when the position command signal formed by a periodic signal is input to the control model may be determined, a phase difference between the position command signal and the model output may be determined, and the determined phase difference may be set as the predetermined delay time used in the delay time calculating step.

Preferably, an actual output of the control object driven on the basis of the position command signal formed by a step signal may be determined in advance, a time constant based on a response time required for the actual output to reach the position indicated by the position command signal may be determined, and the time constant may be set as the predetermined delay time used in the delay time calculating step.

A control device according to the present invention is a control device that performs position control of a control object while compensating for backlash in the control object, the control object being configured to move periodically. The control device includes a controller configured to generate a final position command signal by shifting a backlash quantity signal that compensates for the backlash and adding the backlash quantity signal to a position command signal indicating a position of the control object, the controller being configured to perform position control of the control object on the basis of the generated final position command signal.

Preferably, the controller may include a position command signal generating unit configured to generate the position command signal; a control direction detecting unit configured to detect, on the basis of the position command signal generated by the position command signal generating unit, a control direction for controlling the control object; a backlash quantity calculating unit configured to generate, in accordance with the control direction detected by the control direction detecting unit, a backlash quantity signal for compensating for the amount of backlash in the control object; a delay time calculating unit configured to generate a backlash correction signal by delaying, by a predetermined delay time with respect to the position command signal, the backlash quantity signal generated by the backlash quantity calculating unit; a signal adding unit configured to generate a final position command signal by adding the backlash correction signal generated by the delay time calculating unit to the position command signal; and a position control unit configured to control the position of the control object on the basis of the final position command signal generated by the signal adding unit.

Advantageous Effects of Invention

When a position command signal indicating a position of a control object, such as an industrial robot, is a periodic signal like a sine wave, the control method and the control device according to the present invention can make the behavioral range (amplitude of reciprocation) of the control object the same as that in the case where a speed reducer has no backlash, or the same as the amplitude of the position command signal.

BRIEF DESCRIPTION OF DRAWINGS

FIG. 1 schematically illustrates a configuration of a control device and a robot according to a first embodiment of the present invention.

DESCRIPTION OF EMBODIMENTS

Figure 2A:
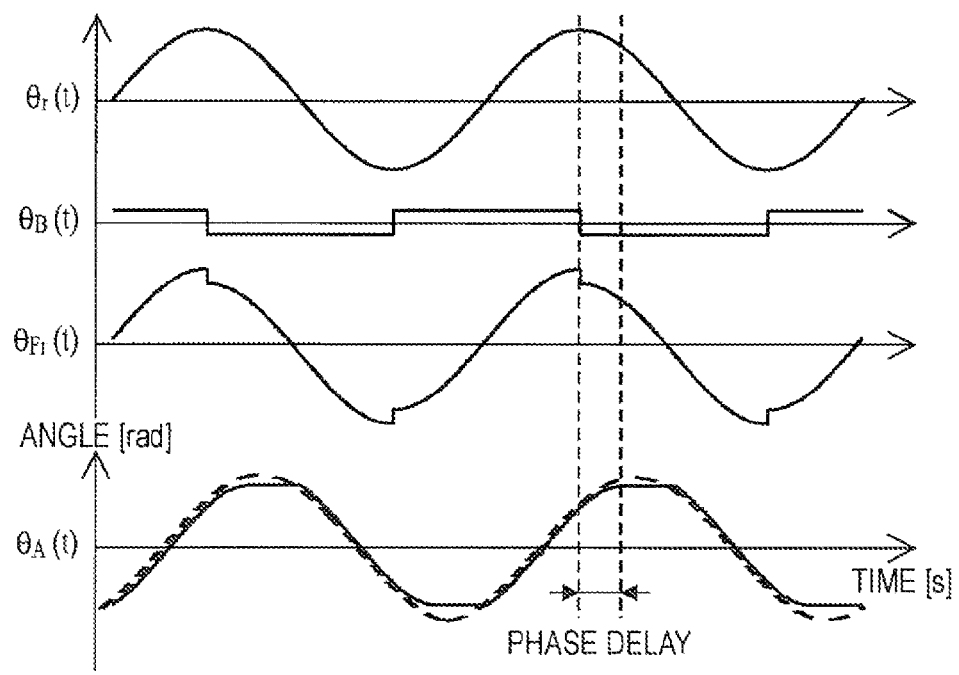
FIG. 2A is a graph showing temporal changes of each signal in conventional backlash quantity compensation.

Each embodiment of the present invention will now be described on the basis of the drawings. In the following description, the same components are given the same reference numerals. Names and functions of the same components are also the same. Therefore, a detailed description of the same components will not be repeated.

[First Embodiment]

A control method and a control device for controlling an arm according to a first embodiment of the present invention will be described with reference to the drawings.

An overall configuration of a robot system 1 will be described, to which the control method and the control device of the present embodiment are applied.

As illustrated in FIG. 1, the robot system 1 includes a robot (welding robot) 2 configured to perform a welding operation, a control device 3 configured to control the operation of the welding robot 2, and a teach data generating device formed by an information processing device, such as a personal computer. The teach data generating device is not shown in FIG. 1.

The welding robot 2 is a six-axis vertical articulated industrial robot having a tip provided with a welding tool 4 formed, for example, by a welding torch. The welding robot 2 may be mounted on a slider (not shown) configured to move the welding robot 2.

As illustrated in FIG. 1, a joint that connects each arm of the welding robot 2 includes a motor 6, a speed reducer 7, and an encoder 8. For example, an arm 5 to which the welding tool 4 is attached is connected via the speed reducer 7 to the motor 6. The motor 6 which is a control object is rotated by an instruction from the control device 3 (described below). The rotation of the motor 6 is slowed down by the speed reducer and transmitted to the arm 5 which is also a control object.

The encoder 8 is a device attached to the motor 6. The encoder 8 detects a rotation angle of the motor 6, and outputs the detected rotation angle as a rotation angle signal to the control device 3.

The speed reducer 7 attached to the motor 6 has backlash because it is formed by a plurality of gears. Therefore, when the rotation direction of the motor 6 is reversed to cause the speed reducer 7 moving in the forward direction to move backward, the backlash causes a time difference to occur, at the moment of the reversal, between the time when the motor 6 starts to rotate backward and the time when the speed reducer 7 starts (outputs) a backward motion. That is, the presence of backlash causes an error phenomenon in which, when the rotation direction of the motor 6 is reversed, the rotation of the motor 6 does not match the motion (output) of the speed reducer 7.

To compensate for the error (i.e., to eliminate the error phenomenon) caused by the backlash, the control device 3 of the present invention includes a backlash quantity calculating unit 9 and a delay time calculating unit 10, which will be described in detail later on.

The control device 3 included in the robot system 1 controls the operation of the welding robot 2 in accordance with a teach program taught in advance. The teach program may be generated by using a teach pendant connected to the control device 3, or may be generated offline by using a teach data generating device (not shown). In either case, the teach program is generated in advance before the welding robot 2 actually performs a welding operation. The teach program generated by using the teach data generating device may be passed, through a medium or the like that magnetically or electrically stores data, to the control device 3, or may be transferred to the control device 3 by data communication.

The control device 3 has a controller 15 that includes a position command signal generating unit 11, a control direction detecting unit 12, the backlash quantity calculating unit 9, the delay time calculating unit 10, a signal adding unit 13, and a position control unit 14.

Each component of the control device 3 will be described with reference to FIG. 1, FIG. 2A, and FIG. 2B.

To control a rotation angle position of the arm 5, the position command signal generating unit 11 generates and outputs a position command signal $\theta_r(t)$ for specifying a rotation angle position of the motor 6 corresponding to the rotation angle position of the arm 5.

Figure 2B:
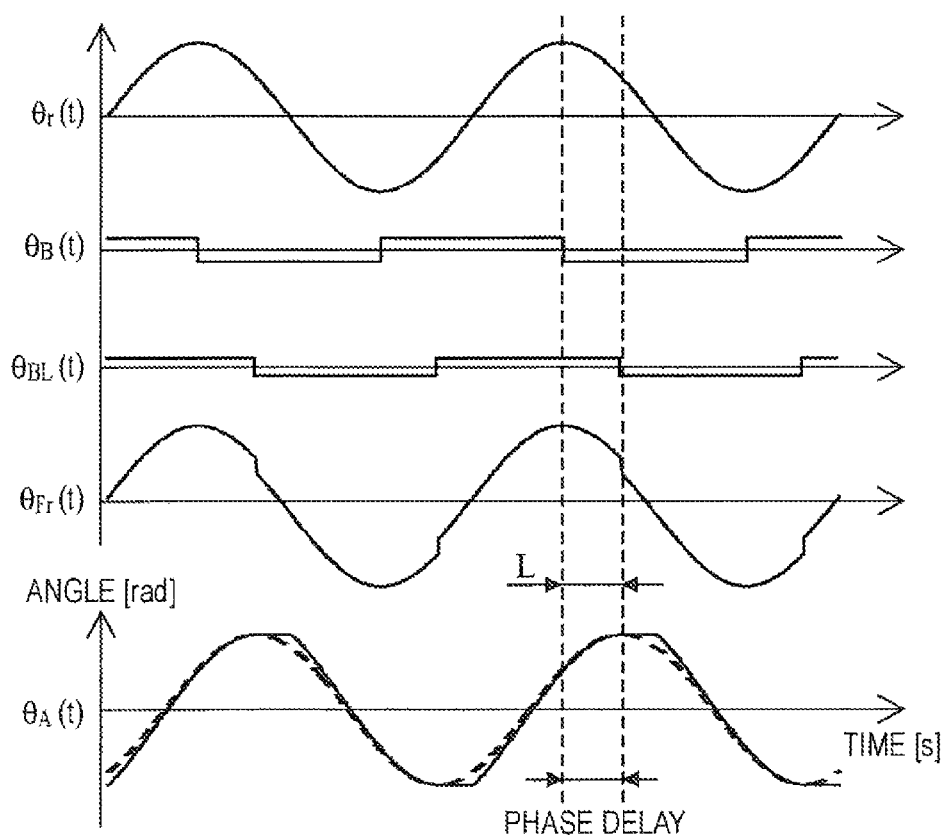
FIG. 2B is a graph showing temporal changes of each signal in backlash quantity compensation according to the first embodiment of the present invention.

As illustrated in FIG. 2B, the position command signal $\theta_r(t)$ is a signal that periodically changes like a sine wave and indicates the rotation angle position of the motor 6 (such that the rotation control direction for controlling the motor 6 periodically changes). The signal that periodically changes is emitted in weaving or the like when the arm 5 is swung from side to side with respect to a weld line.

The control direction detecting unit 12 detects the rotation control direction for controlling the motor 6 from the position command signal output from the position command signal generating unit 11, and outputs a stepped control direction signal having a positive or negative value of 1 in accordance with the control direction.

The value of the control direction signal changes from positive to negative or negative to positive at a peak position of the position command signal $\theta_r(t)$. That is, the waveform of the control direction signal changes in a stepped manner from a value of 1 to a value of −1 or from a value of −1 to a value of 1 at a peak position of the position command signal $\theta_r(t)$.

When the control direction is not reversed, the control direction detecting unit 12 continues to output a control direction signal with the same value. In the initial state, the control direction detecting unit 12 outputs a control direction signal with a value of 0.

The backlash quantity calculating unit 9 multiplies the control direction signal output from the control direction detecting unit 12 by a predetermined backlash compensation gain B to generate and output a backlash quantity signal $\theta_B(t)$. The backlash quantity signal $\theta_B(t)$ is a signal obtained by multiplying a stepped control direction signal having a positive or negative value of 1 by the backlash compensation gain B. Therefore, the backlash quantity signal $\theta_B(t)$ has a stepped waveform like the control direction signal.

The backlash quantity signal $\theta_B(t)$ shown in FIG. 2B is obtained by multiplying the control direction signal by the backlash compensation gain B. Therefore, like the control direction signal, the value of the backlash quantity signal $\theta_B(t)$ changes in a stepped manner from positive to negative or negative to positive at a peak position of the position command signal $\theta_r(t)$. That is, each peak position of the position command signal $\theta_r(t)$ coincides with the corresponding position at which the value of the backlash quantity signal $\theta_B(t)$ changes in a stepped manner.

The value of the backlash compensation gain B is set such that the value of the backlash quantity signal $\theta_B(t)$ has a magnitude corresponding to the amount of backlash in the speed reducer 7.

The delay time calculating unit 10 generates a backlash correction signal $\theta_{BL}(t)$ by delaying, by a given time L (delay time L), the backlash quantity signal $\theta_B(t)$ output from the backlash quantity calculating unit 9, and outputs the backlash correction signal $\theta_{BL}(t)$.

The backlash correction signal $\theta_{BL}(t)$ shown in FIG. 2B has a waveform obtained by delaying (shifting) the backlash quantity signal $\theta_B(t)$ by the delay time L. That is, each position at which the value of the backlash correction signal $\theta_{BL}(t)$ changes in a stepped manner is delayed (shifted) by the delay time L from the corresponding peak position of the position command signal $\theta_r(t)$.

Note that the backlash quantity calculating unit 9 and the delay time calculating unit 10 are collectively referred to as a backlash correction signal calculating section.

The signal adding unit 13 adds the backlash correction signal $\theta_{BL}(t)$ output from the delay time calculating unit 10 to the position command signal $\theta_r(t)$ output from the position command signal generating unit 11 to generate and output a final position command signal $\theta_{Fr}(t)$.

FIG. 2B shows the final position command signal $\theta_{Fr}(t)$ generated by adding the backlash correction signal $\theta_{BL}(t)$ to the position command signal $\theta_r(t)$. Since the backlash correction signal $\theta_{BL}(t)$ is delayed by the delay time L from each peak position of the position command signal $\theta_r(t)$, the corresponding step of the waveform of the final position command signal $\theta_{Fr}(t)$ caused by the backlash correction signal $\theta_{BL}(t)$ is also delayed by the delay time L.

The position control unit 14 calculates a command voltage of the motor 6 and controls the rotational position of the motor 6 such that the rotation angle signal of the motor 6 detected by the encoder 8 follows the final position command signal $\theta_{Fr}(t)$ output from the signal adding unit 13. Under the control of the position control unit 14, the motor 6 operates to drive the arm 5 through the speed reducer 7.

FIG. 2B shows that in the control according to the final position command signal $\theta_{Fr}(t)$ obtained by adding the backlash correction signal $\theta_{BL}(t)$ to the position command signal $\theta_r(t)$, the amplitude of a rotation angle $\theta_A(t)$ of the arm 5 can be made substantially the same as the amplitude of the original position command signal $\theta_r(t)$ indicated by a broken line.

In the present embodiment, where the backlash correction signal $\theta_{BL}(t)$ which is delayed by the delay time L is used, it is possible to eliminate the effect of backlash on the reciprocating motion of the arm 5 which cannot be eliminated by the procedure of the conventional backlash compensation illustrated in FIG. 2A.

The necessity for adopting the backlash correction signal $\theta_{BL}(t)$ delayed by the delay time L will be described from another perspective by using, as an example, the case where weaving is performed by the robot system 1 having the configuration described above.

As described above, weaving involves swinging the arm 5 having the welding tool 4 at the tip thereof from side to side with respect to a weld line. In other words, the position control unit 14 causes the arm 5 to reciprocate by controlling the rotational position of the motor 6 in accordance with the position command signal $\theta_r(t)$ which is a periodic signal like a sine wave or the final position command signal $\theta_{Fr}(t)$.

Figure 3:
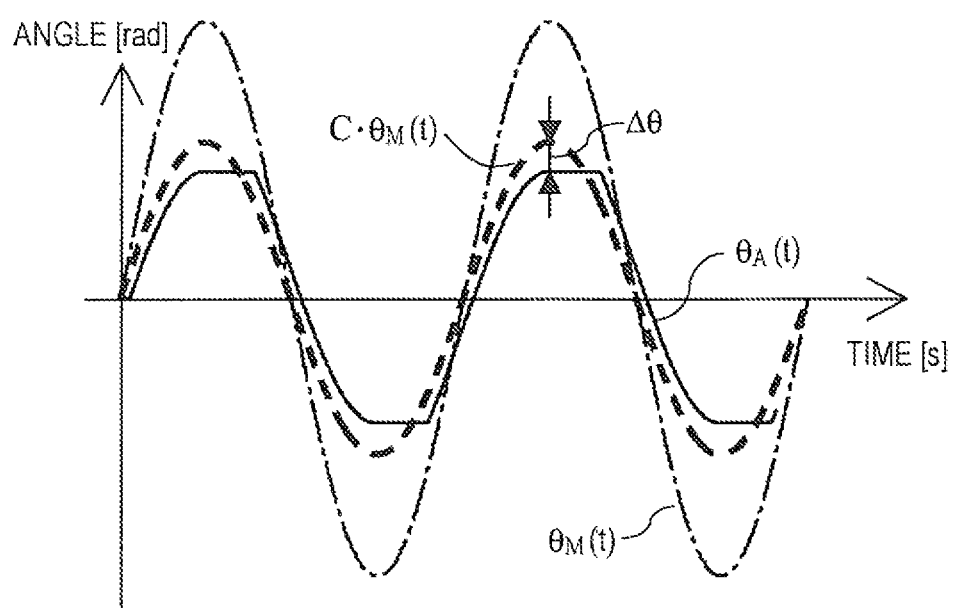
FIG. 3 shows angular transmission of a speed reducer having backlash.

As shown in FIG. 3, the reciprocating motion (in particular, reciprocating reversal) of the arm 5 here is delayed in phase from the position command signal due to backlash in the speed reducer 7. If a force in the rotation direction generated by the inertial force or gravity acting on the arm 5 is smaller than the frictional force of the speed reducer 7, the speed reducer 7 performs angular transmission approximately in accordance with expression (1) described below.

[Expression 1]

$$\begin{cases} \theta_A(t) = C \cdot \theta_M(t) + \Delta\theta & (v_A(t) < 0) \\ \theta_A(t) = C \cdot \theta_M(t) - \Delta\theta & (v_A(t) > 0) \\ C \cdot \theta_M(t) - \Delta\theta < \theta_A(t) < C \cdot \theta_M(t) + \Delta\theta & (v_A(t) = 0) \end{cases} \quad (1)$$

$\theta_M(t)$: rotation angle of motor
$\theta_A(t)$: rotation angle of arm
$v_A(t)$: rotation angle speed of arm
C: reduction ratio
$\Delta\theta$: amount of backlash in speed reducer FIG. 3 is a graph showing a relationship in expression (1). In FIG. 3, a rotation angle $\theta_M(t)$ of the motor 6 is shown as a sine wave indicated by a dot-and-dash line. In FIG. 3, $C \cdot \theta_M(t)$ obtained by multiplying the rotation angle $\theta_M(t)$ of the motor 6 by a reduction ratio C of the speed reducer 7 is indicated by a broken line. If the speed reducer 7 has no backlash, a waveform representing the output of the speed reducer 7 has the shape indicated by this broken line. In this case, the rotation angle $\theta_A(t)$ of the arm 5 attached to the speed reducer 7 has the same waveform as that indicated by the broken line. However, due to the presence of backlash, the waveform of the actual rotation angle $\theta_A(t)$ of the arm 5 is that indicated by a solid line in FIG. 3, Note that a sign that ends with (t) represents a signal whose value changes with time (seconds or s).

As compared to the output of the speed reducer 7 indicated by the broken line, the solid waveform representing the actual rotation angle $\theta_A(t)$ of the arm 5 is smaller in amplitude by the amount of backlash $\Delta\theta$ in the speed reducer 7. Also, due to the presence of backlash, the phase of the waveform of the actual rotation angle $\theta_A(t)$ is delayed from the phase of the rotation angle em(t) of the motor 6 indicated by the dot-and-dash line.

For the rotation angle $\theta_A(t)$ of the arm 5 delayed in phase from the position command signal $\theta_r(t)$ and the rotation angle $\theta_M(t)$ of the motor 6, it is necessary to make compensation (backlash compensation) for the loss of amplitude caused by backlash.

In the present embodiment, as described above, the loss of amplitude of the rotation angle $\theta_A(t)$ of the arm 5 caused by backlash is compensated for by adding the backlash correction signal $\theta_{BL}(t)$ shown in FIG. 2B to the position command signal $\theta_r(t)$ to generate the final position command signal $\theta_{Fr}(t)$. Generation of the backlash correction signal $\theta_{BL}(t)$ and generation of the final position command signal $\theta_{Fr}(t)$ will now be described step by step.

Generation of the backlash correction signal $\theta_{BL}(t)$ will be described with reference to FIGS. 4 and 5.

The position command signal generating unit 11 of the control device 3 generates and outputs the position command signal $\theta_r(t)$ indicating the rotation angle position of the arm for carrying out weaving. The weaving requires the arm 5 to smoothly reciprocate with constant amplitude. Therefore, the position command signal generating unit 11 outputs the sinusoidal position command signal $\theta_r(t)$ such as that shown in FIG. 5 (step S1 in FIG. 4: position command signal generating step).

From the position command signal $\theta_r(t)$ output from the position command signal generating unit 11 in step S1, the control direction detecting unit 12 detects a direction (control direction) for controlling the rotation of the arm 5, and outputs a stepped control direction signal $\theta_\pm(t)$ in accordance with the detected control direction. The control direction signal $\theta_\pm(t)$ is a stepped signal having a positive or negative value of 1, such as that shown in FIG. 5, and is defined by expression (2) on the basis of a differential value of the position command signal $\theta_r(t)$ (step S2 in FIG. 4: control direction detecting step).

[Expression 2]

$$\begin{cases} \theta_\pm(t) = 1 & (d\theta_r(t)/dt > 0) \\ \theta_\pm(t) = -1 & (d\theta_r(t)/dt < 0) \end{cases} \quad (2)$$

On the basis of the control direction signal $\theta_\pm(t)$ output from the control direction detecting unit 12 in step S2, the backlash quantity calculating unit 9 generates the backlash quantity signal $\Theta_B(t)$ in accordance with the following procedure and outputs the backlash quantity signal $\Theta_B(t)$ (backlash quantity calculating step). The delay time calculating unit 10 delays the backlash quantity signal $\theta_B(t)$ by the delay time L to generate the backlash correction signal $\theta_{BL}(t)$ in accordance with the following procedure, and outputs the backlash correction signal $\theta_{BL}(t)$ (delay time calculating step) (step S3 in FIG. 4).

First, by using the reduction ratio (C in expression (1)) of the speed reducer 7 and the amount of backlash in the speed reducer 7 ($\Delta\theta$ in expression (1)) measured in advance, the backlash quantity calculating unit 9 calculates the backlash compensation gain B in accordance with expression (3).

[Expression 3]

$$B = \Delta\theta/C \quad (3)$$

Next, as shown in expression (4), the backlash quantity calculating unit 9 multiplies the control direction signal $\theta_\pm(t)$ output in step S2 by the backlash compensation gain B to generate the backlash quantity signal $\theta_B(t)$.

[Expression 4]

$$\theta_B(t) = B \cdot \theta_\pm(t) \quad (4)$$

Figure 5:
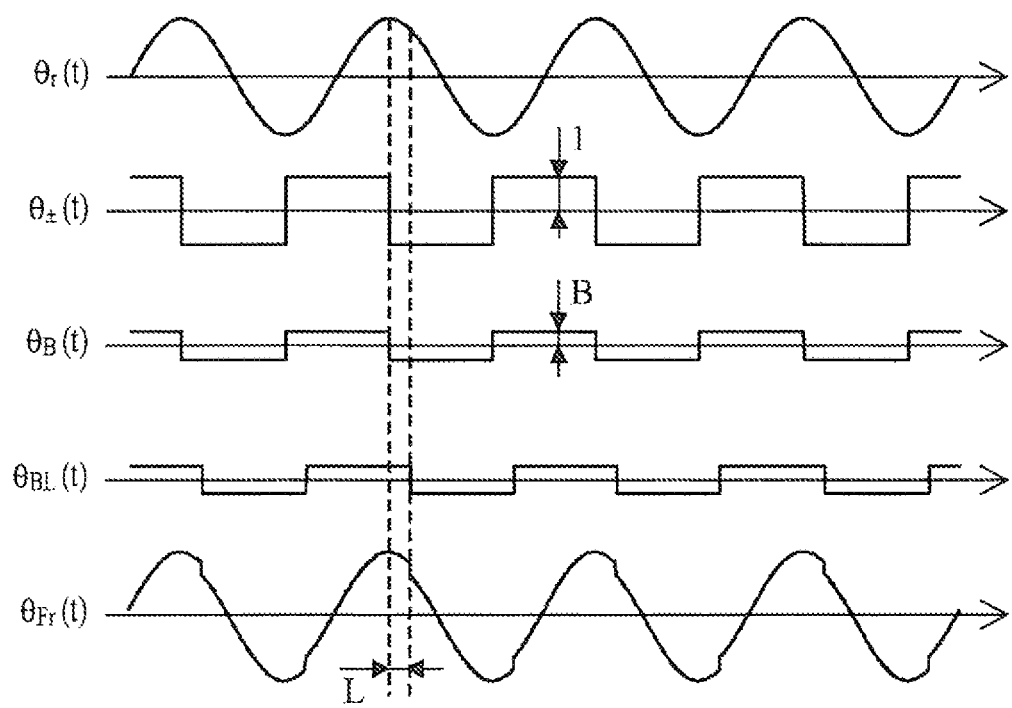
FIG. 5 illustrates in detail how signals change in the backlash quantity compensation according to the first embodiment.

If the backlash compensation gain B is a value less than 1, the generated backlash quantity signal $\theta_B(t)$ is a stepped signal having an amplitude smaller than that of the control direction signal $\theta_\pm(t)$, as shown in FIG. 5. Thus, on the basis of the control direction signal $\theta_\pm(t)$, the backlash quantity signal $\theta_B(t)$ having an amplitude corresponding to the amount of backlash can be obtained. This process is referred to as the backlash quantity calculating step.

Next, by delaying the obtained backlash quantity signal $\theta_B(t)$ by the delay time L without changing the waveform and the amplitude, the delay time calculating unit 10 generates and outputs the backlash correction signal $\theta_{BL}(t)$ shown in FIG. 5. The backlash correction signal $\theta_{BL}(t)$ is defined by expression (5). This process is referred to as the delay time calculating step. A method for setting the delay time L will be described later on.

[Expression 5]

$$\theta_{BL}(t) = \theta_B(t-L) \quad (5)$$

The backlash correction signal $\theta_{BL}(t)$, which is a technical feature of the present embodiment, can be obtained by the processes described above. With reference to FIGS. 4 and 5, the subsequent process will be described which involves using the backlash correction signal $\theta_{BL}(t)$ to generate the final position command signal $\theta_{Fr}(t)$, and controlling the arm 5 in accordance with the generated final position command signal $\theta_{Fr}(t)$.

Figure 4:
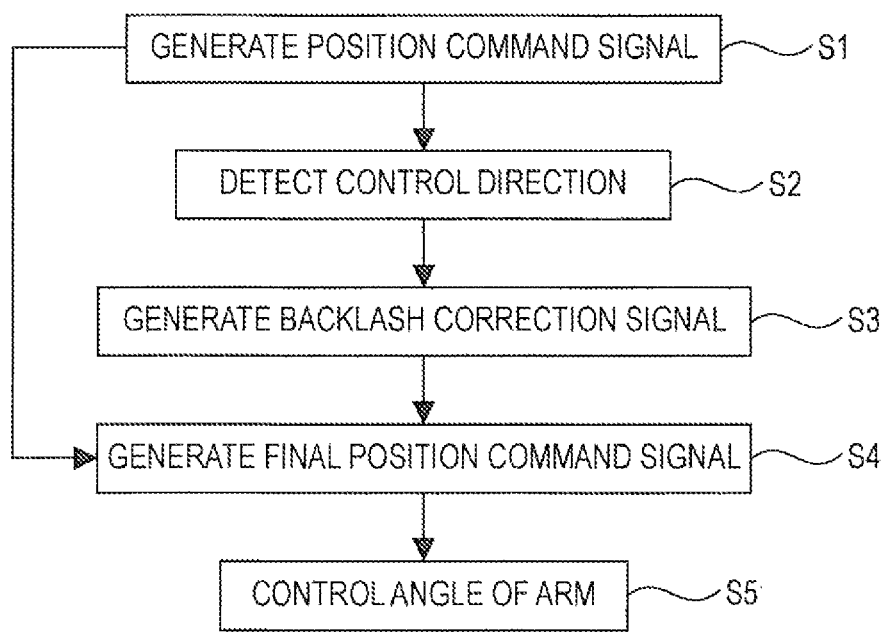
FIG. 4 is a flowchart of processing in the backlash quantity compensation according to the first embodiment.

The signal adding unit 13 adds the backlash correction signal $\Theta_{BL}(t)$ output from the delay time calculating unit 10 in step S3 to the position command signal $\theta_r(t)$ output from the position command signal generating unit 11 in step S1, so as to generate and output the final position command signal $\theta_{Fr}(t)$ defined by expression (6) (step S4 in FIG. 4: signal adding step).

The series of steps S1 to S4 described above is referred to as a final position command signal generating step.

[Expression 6]

$$\theta_{Fr}(t) = \theta_{BL}(t) + \theta_r(t) \quad (6)$$

As shown in FIG. 5, in the waveform of the final position command signal $\theta_{Fr}(t)$ obtained by the procedure described above, each step caused by the backlash correction signal $\theta_{BL}(t)$ is delayed by the delay time L from the corresponding peak position.

The position control unit 14 calculates the command voltage of the motor 6 and controls the rotational position of the motor 6 such that the rotation angle signal of the motor 6 detected by the encoder 8 follows the final position command signal $\theta_{Fr}(t)$ output from the signal adding unit 13. Under the control of the position control unit 14, the motor 6 operates to control the angle of the arm 3 through the speed reducer 7 (step S5 in FIG. 4: position control step).

By the processing in steps S1 to S5 described above, weaving can be performed by the robot system 1 unaffected by backlash.

Figure 6A:
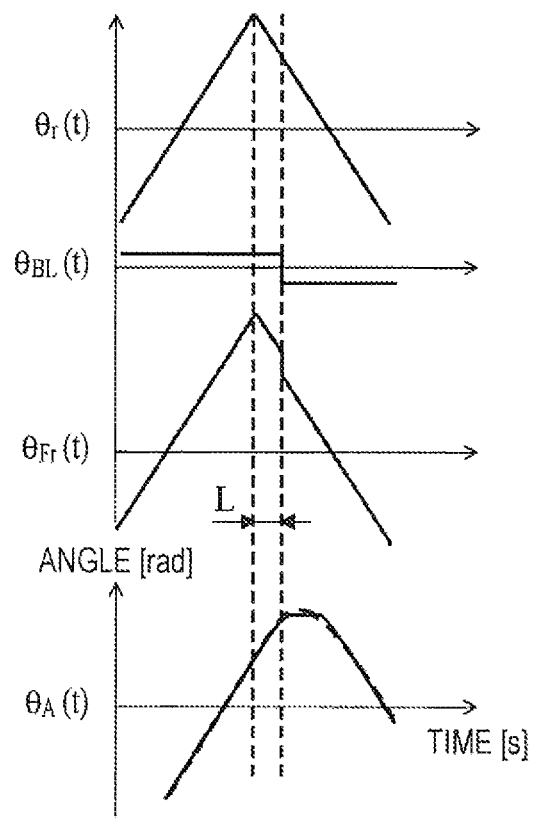
FIG. 6A illustrates an effect of the backlash quantity compensation according to the first embodiment.
Figure 6B:
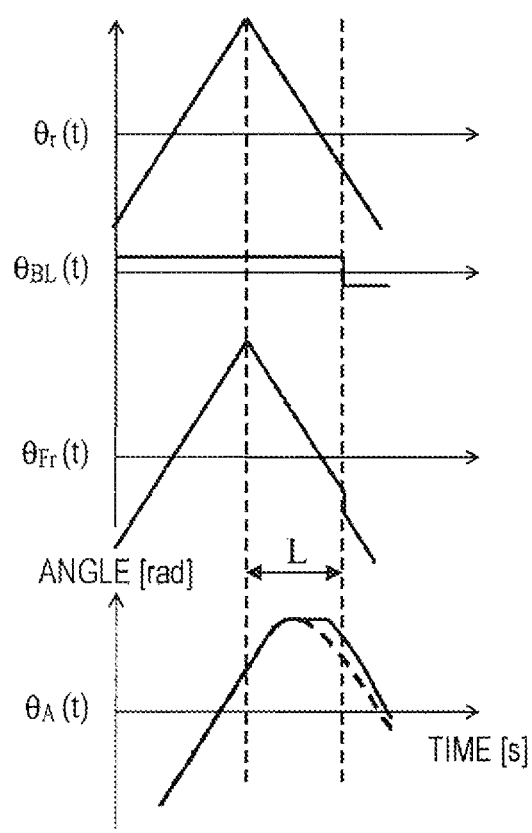
FIG. 6B illustrates an effect of the backlash quantity compensation according to the first embodiment.
Figure 6C:
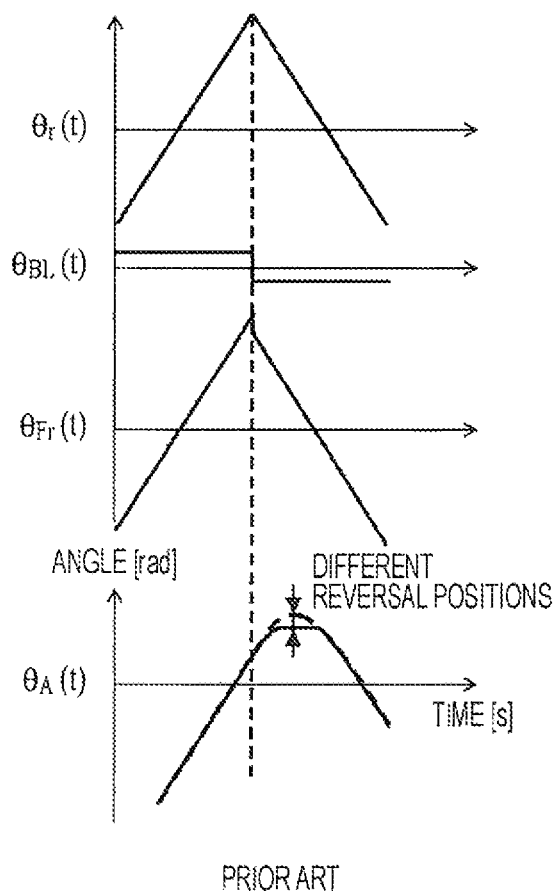
FIG. 6C illustrates an effect of the backlash quantity compensation according to the first embodiment.

A method for setting the delay time L according to the present embodiment will now be described with reference to FIGS. 6A to 6C. FIGS. 6A to 6C show temporal changes of each signal and the rotation angle of the arm 5 obtained when the present embodiment is applied to the cases where a set value of the delay time L is small and large. FIGS. 6A to 6C each show, from the top, the position command signal $\theta_r(t)$, the backlash correction signal $\theta_{BL}(t)$, the final position command signal $\theta_{Fr}(t)$, and the rotation angle $\theta_A(t)$ of the arm 5 in this order.

In the present embodiment, the delay time calculating unit 10 sets the delay time L (seconds) to be longer than or equal to the length of time from when the control direction detected by the control direction detecting unit 12 is reversed to when the behavior of the arm 5 is actually reversed.

By setting the delay time L (seconds) as described above, the amplitude of the arm 5 becomes the same as that in the case without backlash. That is, the amplitude of the arm 5 indicated by a solid line becomes the same as the amplitude obtained in the case without backlash and indicated by a broken line (i,e, the position represented by the original position command signal $\theta_r(t)$) (see FIG. 6B).

If the delay time L is set to be shorter than the length of time from when the control direction is reversed to when the behavior of the arm 5 is actually reversed, the amplitude of the arm 5 indicated by a solid line is smaller than the amplitude obtained in the case without backlash and indicated by a broken line (see FIG. 6A). However, as compared to the prior art illustrated in FIG. 6C where the delay time L is 0, the amplitude of the arm 5 is closer to that in the case without backlash. This indicates that if the delay time L is even slightly larger than 0, the reversal time (update time) of the backlash correction signal $\theta_{BL}(t)$ can be delayed, and the actual reversal time of the arm 5 becomes closer to the reversal time of the arm 5 an the case without backlash.

In the present embodiment, based on the idea described above, a set value of the delay time L is set to be larger than 0. Thus, the reversal position (amplitude) of the behavior of the arm 5 is brought closer to the reversal position (amplitude) in the case without backlash.

For example, if the delay time L is set to be longer than or equal to the length of time from when the control direction indicated by the position command signal $\theta_r(t)$ is reversed to when the next reversal takes place, that is, if the delay time L set by the setting method described above is too large, the behavior of the arm 5 in the next reversal may be affected.

Also, when the position command signal $\theta_r(t)$ is a periodic signal, if the delay time L is set to be longer than or equal to half the period of the position command signal $\theta_r(t)$, the behavior of the arm 5 in the next reversal may be affected. In such a case, if the delay time L is set to be shorter than or equal to half the period of the position command signal $\theta_r(t)$, the effect of the present embodiment described above can be achieved.

The method for determining the delay time L according to the first embodiment is as described above.

[Second Embodiment]

A second embodiment of the present invention will now be described.

A configuration of the robot system 1 according to the present embodiment is substantially the same as that in the first embodiment described above. A difference from the first embodiment is how the delay time calculating unit 10 sets the delay time L. A method for setting the delay time L according to the second embodiment will be described with reference to FIGS. 7 and 8.

The present embodiment will describe a method for accurately setting the delay time L in accordance with the following procedure when the position command signal $\theta_r(t)$ generated by the position command signal generating unit 11 is a periodic signal with a frequency ω (rad/s).

(Step 1)

First, as a signal (final position command signal $\theta_{Fr}(t)$) input to the position control unit 14, a periodic signal (e.g., sinusoidal signal) with a frequency ω (rad/s), the periodic signal not including the backlash correction signal $\theta_{BL}(t)$, is adopted and the rotation angle $\theta_A(t)$ of the arm 5 is measured (by actual measurement). If there is no means for actually measuring the rotation angle $\theta_A(t)$ of the arm 5, $C \cdot \theta_M(t)$ obtained by multiplying the rotation angle $\theta_M(t)$ of the motor 6 measured by the encoder 8 by the reduction ratio C of the speed reducer 7 is used as the rotation angle $\theta_A(t)$ of the arm 5 here.

Figure 7:
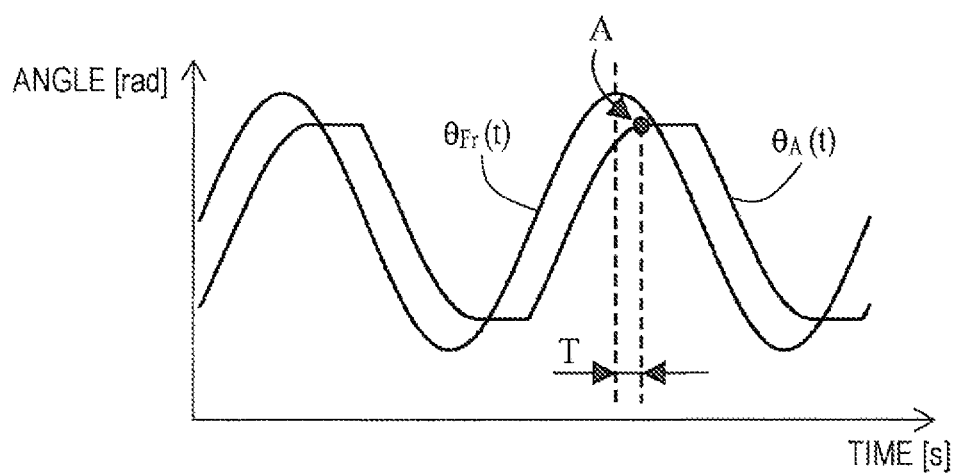
FIG. 7 is a graph showing a frequency response of a rotation angle of an arm according to a second embodiment of the present invention.

FIG. 7 is a graph showing the final position command signal $\theta_{Fr}(t)$, which is a periodic signal with the frequency ω (rad/s), and the rotation angle $\theta_A(t)$ of the arm 5 actually measured and superimposed on the final position command signal $\theta_{Fr}(t)$.

(Step 2)

As shown in FIG. 7, at a time point when the rotation angle $\theta_A(t)$ of the arm 5 actually measured periodically moves, a phase difference T between the final position command signal $\theta_{Fr}(t)$ and the rotation angle $\theta_A(t)$ of the arm 5 actually measured is determined. Then, the length of time corresponding to the phase difference T is set as the delay time L.

For example, for the final position command signal $\theta_{Fr}(t)$ and the rotation angle $\theta_A(t)$ of the arm 5 in FIG. 7, a time difference (phase difference T) between the corresponding peaks of their waveforms is determined, and the phase difference T is set as the delay time L. The peak of the rotation angle $\theta_A(t)$ of the arm 5 continues for a certain length of time due to the effect of backlash. Here, the initial time point at which the rotation angle $\theta_A(t)$ reaches the peak value (i.e., tune at point A in FIG. 7) is regarded as a peak time for the rotation angle $\theta_A(t)$ of the arm 5, and the phase difference T is determined.

Figure 8:
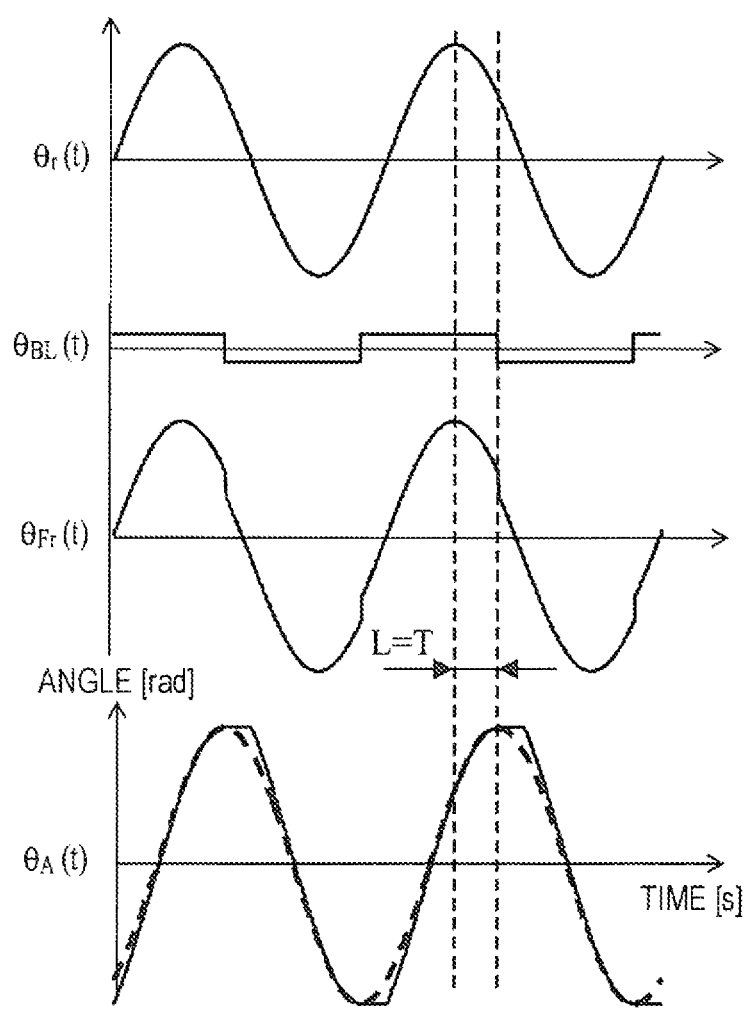
FIG. 8 illustrates an effect of backlash quantity compensation according to the second embodiment.

With reference to FIG. 8, an effect of the present embodiment will be described, which is achieved when the delay time L is set as described above. FIG. 8 shows temporal changes of each signal and the rotation angle $\theta_A(t)$ of the arm 5 obtained when the present embodiment is applied to the robot system 1.

FIG. 8 shows, from the top, the position command signal $\theta_r(t)$, the backlash correction signal $\Theta_{BL}(t)$, the final position command signal $\theta_{Fr}(t)$, and the rotation angle $\theta_A(f)$ of the arm 5 in this order. The backlash correction signal $\theta_{BL}(t)$ is delayed by the delay time L set in accordance with the procedure described above. In the graph at the bottom of FIG. 8, a solid line represents the rotation angle $\theta_A(t)$ of the arm 5 obtained in the case of applying the present embodiment, and a broken line represents an amplitude obtained when the speed reducer 7 has no backlash (i.e., a position indicated by the original position command signal $\theta_r(t)$). This graph shows that because of the backlash compensation according to the present embodiment, the amplitude of the behavior of the arm 5 obtained when the position command signal $\theta_r(t)$ is a periodic signal (sinusoidal signal here) is made substantially the same as that in the case without backlash,

[Third Embodiment]

A third embodiment of the present invention will now be described.

A configuration of the robot system 1 according to the present embodiment is substantially the same as those in the first and second embodiments described above. A difference from the first and second embodiments is how the delay time calculating unit 10 sets the delay time L. A method for setting the delay time L according to the present embodiment will be described with reference to FIGS. 9 and 10.

In the present embodiment, the delay time L is determined on the basis of the rotation angle $\theta_A(t)$ of the arm 5 actually measured when a step signal is input to the position control unit 14. This setting method which involves using a step signal is effective even when the position command signal $\theta_r(t)$ generated by the position command signal generating unit 11 is not a periodic signal. A procedure for setting the delay time L will be sequentially described below.

(Step 1)

First, as a signal (final position command signal $\theta_{Fr}(t)$) input to the position control unit 14, a signal (step signal) whose value remains constant after a time point 0 (seconds) is adopted and the rotation angle $\theta_A(t)$ of the arm 5 is measured (actual measurement). If there is no means for actually measuring the rotation angle $\theta_A(t)$ of the arm 5, $C \cdot \theta_M(t)$ obtained by multiplying the rotation angle $\theta_M(t)$ of the motor 6 measured by the encoder 8 by the reduction ratio C of the speed reducer 7 is used as the rotation angle $\theta_A(t)$ of the arm 5 here.

Figure 9:
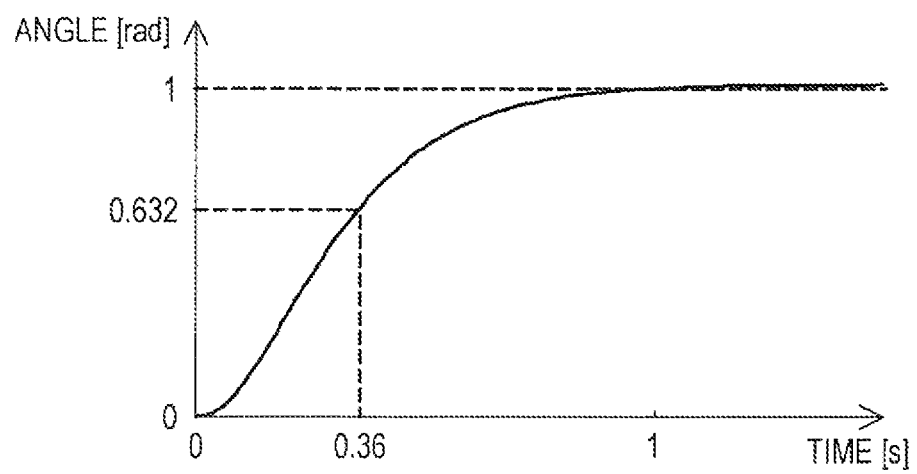
FIG. 9 is a graph showing a step response of a rotation angle of an arm according to a third embodiment of the present invention.

FIG. 9 is a graph showing an actually measured value of a step response of the rotation angle $\theta_A(t)$ of the arm 5 to the step signal input to the position control unit 14. In the step response shown in FIG. 9, the rotation angle $\theta_A(t)$ of the arm 5 reaches a steady-state value 1 in a certain time after the step signal is input.

(Step 2)

On the basis of the graph of FIG. 9, the time (time constant) required for the actually measured rotation angle $\theta_A(t)$ of the arm 5 to reach about 63.2% of the steady-state value is determined, and the time constant is used as the delay time L. When the waveform of the rotation angle $\theta_A(t)$ of the arm 5 shown in FIG. 9 is obtained using a step signal with a magnitude of 1 (radian), the time taken to reach 0.632 (radians) is 0.36 (seconds), which is the time constant used as the delay time L.

Figure 10:
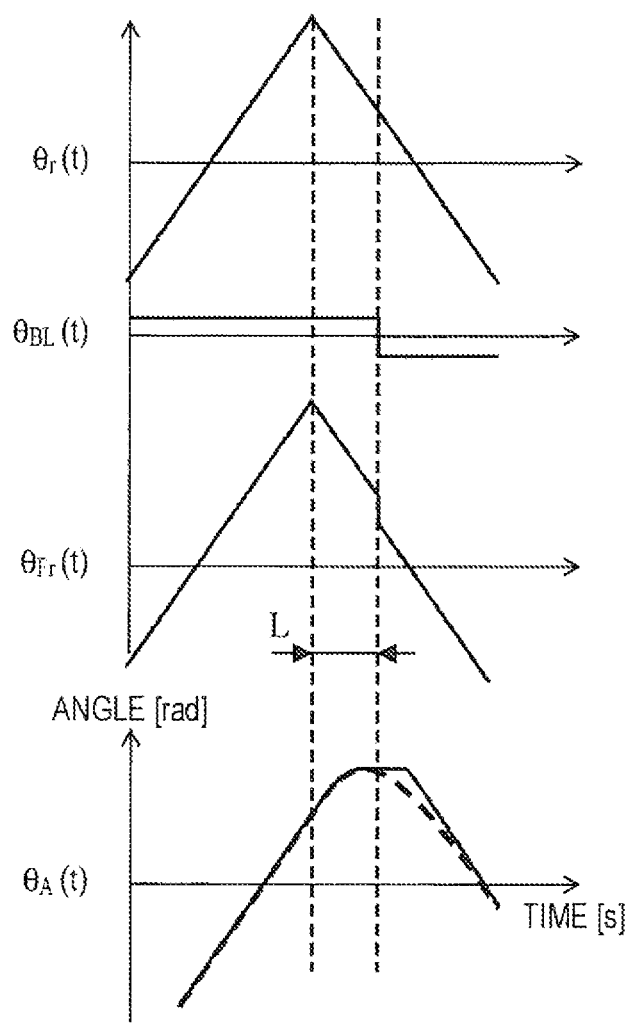
FIG. 10 illustrates an effect of backlash quantity compensation according to the third embodiment.

With reference to FIG. 10, an effect of the present embodiment will be described, which is achieved when the delay time L is set using a time constant. FIG. 10 shows temporal changes of each signal and the rotation angle $\theta_A(t)$ of the arm 5 obtained when the present embodiment is applied to the robot system 1.

FIG. 10 shows, from the top, the position command signal $\theta_r(t)$, the backlash correction signal $\theta_{BL}(t)$, the final position command signal $\theta_{Fr}(t)$, and the rotation angle $\theta_A(t)$ of the, arm 5 in this order. The backlash correction signal $\theta_{BL}(t)$ is delayed by the delay time L set by using the time constant described above. In the graph at the bottom of FIG. 10, a solid line represents the rotation angle $\theta_A(t)$ of the arm 5 obtained in the case of applying the present embodiment, and a broken line represents an amplitude obtained when the speed reducer 7 has no backlash (i.e., a position indicated by the original position command signal $\theta_r(t)$). This graph shows that because of the backlash compensation according to the present embodiment, the amplitude of the behavior of the arm 5 obtained when the position command signal $\theta_r(t)$ is a periodic signal (sinusoidal signal here) is made substantially the same as that in the case without backlash.

By setting the delay time L using the time constant described above, the delay time L becomes suitable for the system of the robot system 1. Therefore, after being reversed, the behavior of the arm 5 quickly becomes closer to that in the case without backlash.

[Fourth Embodiment]

A fourth embodiment of the present invention will now be described.

A configuration of the robot system 1 according to the present embodiment is substantially the same as those in the first to third embodiments described above. A difference from the first to third embodiments is how the delay time calculating unit 10 sets the delay time L. A method for setting the delay time L according to the present embodiment will be described with reference to FIG. 11.

The methods of the second and third embodiments involve actually inputting a step signal or a sinusoidal signal into the robot system 1 and actually measuring the rotation angle $\theta_A(t)$ of the arm 5. In the method of the present embodiment, the delay time L is set on the basis of a model of the welding robot 2. The following describes a procedure for setting the delay time L using the model of the welding robot 2.

Figure 11:
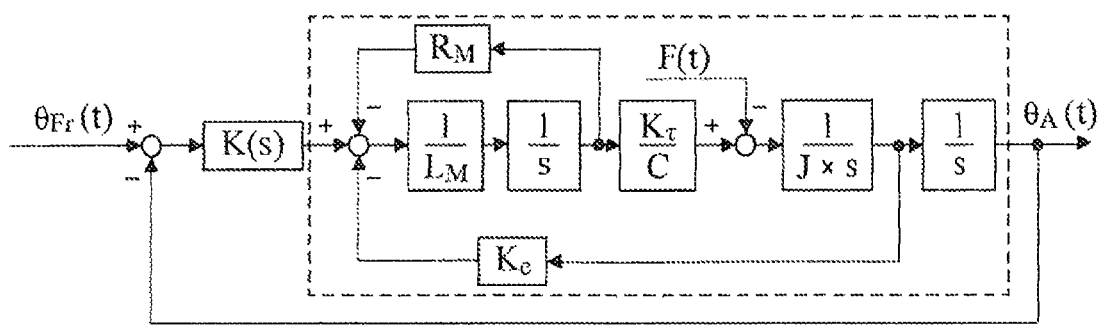
FIG. 11 is a block diagram obtained by modeling a process from a final position command signal to a rotation angle of an arm in backlash quantity compensation according to a fourth embodiment of the present invention.

First, a process from the final position command signal $\theta_{Fr}(t)$, which is a signal input to the position control unit 14, to the rotation angle $\theta_A(t)$ of the arm 5 is modeled in the form of a block diagram of FIG. 11. Note that this is in the case where the speed reducer 7 has no backlash.

In FIG. 11, the letter "s" is a Laplace operator. A region surrounded by a broken line in FIG. 11 is a block diagram showing the motor 6, the speed reducer 7, and the arm 5 as a simple model. J represents a moment of inertia of the arm 5 obtained when moments of inertia of the motor 6 and the speed reducer 7 are regarded as all being present in the arm 5, and C represents a reduction ratio of the speed reducer 7. $R_M$ represents an internal resistance of the motor 6, and $L_M$ represents an internal inductance of the motor 6. $K_t$ represents a torque constant, and $K_e$ represents a back-electromotive force constant. F(t) represents a frictional force acting on the arm 5.

K(s) represents the position control unit 14 and is, for example, PI control expressed by expression (7).

[Expression 7]

$$k_P + k_I/s \qquad (7)$$

s: Laplace operator
$k_P$: proportional gain
$k_I$: integral gain

A transfer function from the final position command signal $\theta_{Fr}(t)$ to the rotation angle $\theta_A(t)$ of the arm 5 can be expressed by expression (8) below.

[Expression 8]

$$\theta_A = \frac{K_t \cdot (k_p \cdot s + k_I)}{J \cdot L_M \cdot C \cdot s^4 + J \cdot R_M \cdot C \cdot s^3 + K_t \cdot K_e \cdot s^2 + K_t \cdot (k_p \cdot s + k_I)} \theta_{Fr} \qquad (8)$$

J: moment of inertia of arm obtained when moments of inertia of motor and speed reducer are regarded as all being present in arm
$L_M$: internal inductance of motor
C: reduction ratio of speed reducer $R_M$: internal resistance of motor
$K_t$: torque constant
$K_e$: back-electromotive force constant
$F(t)$: frictional force acting on arm
s: Laplace operator representing integral
$k_P$: proportional gain
$k_I$: integral gain Here, a transfer function from the final position command signal $\theta_{Fr}(t)$ to the rotation angle $\theta_A(t)$ of the arm 5 in the expression described above will be expressed as $G(s)$.

For this model, as in the third embodiment described above, a simulation is performed in which a step signal is input to determine the output, and thus to determine the delay time L.

When the position command signal $\theta_r(t)$ generated by the position command signal generating unit 11 is a sinusoidal signal with a frequency ω (rad/s), a phase delay $\arg G(j\omega)$ corresponding to the frequency ω(rad/s) in the range from the final position command signal $\theta_{Fr}(t)$ to the rotation angle $\theta_A(t)$ of the arm 5 is determined, where represents an imaginary unit, $G(j\omega)$ is obtained by substituting $j\omega$ for s of $G(s)$, and $\arg G(j\omega)$ represents an argument of $G(j\omega)$. Then, $-\arg G(j\omega))/\omega$ is used as the delay time The delay time L is thus determined from the model of the welding robot 2. Therefore, unlike the second and third embodiments described above, the delay time L can be set without actually performing a measurement experiment with an actual device.

Even when the delay time L set in the present embodiment is used to generate the backlash correction signal $\theta_{BL}(t)$, the same effect as those of the embodiments described above can be achieved.

The embodiments disclosed herein should be considered illustrative, not restrictive, in all respects. In particular, for matters not specifically disclosed in the embodiments herein (e.g., operating conditions, measuring conditions, various parameters, and dimensions, weights, and volumes of components), values that do not depart from the scope typically implemented by those skilled in the art and that can be readily anticipated by those skilled in the art are adopted.

REFERENCE SIGNS LIST

1: robot system
2: welding robot
3: control device
4: welding tool
5: arm
6: motor
7: speed reducer
8: encoder
9: backlash quantity calculating unit
10: delay time calculating unit
11: position command signal generating unit
12: control direction detecting unit
13: signal adding unit
14: position control unit
15: controller

The invention claimed is:

1. A control method that performs position control of a control object while compensating for backlash in the control object, the control object being configured to move periodically along a movement path, the control method comprising:
a final position command signal generating step of generating a final position command signal by shifting a backlash quantity signal that compensates for the backlash and adding the backlash quantity signal to a position command signal indicating a position of the control object; and
a position control step of performing position control of the control object on the basis of the final position command signal generated in the final position command signal generating step;
wherein the final position command signal generating step includes:
a position command signal generating step of generating the position command signal;
a control direction detecting step of detecting, on the basis of the position command signal generated in the position command signal generating step, a control direction for controlling the control object;
a backlash quantity calculating step of generating, in accordance with the control direction detected in the control direction detecting step, a backlash quantity signal for compensating for the amount of backlash in the control object, the backlash quantity signal being a stepped control direction signal having a positive or a negative value of 1 multiplied by a backlash compensation gain;
a delay time calculating step of generating a backlash correction signal by delaying, by a predetermined delay time with respect to the position command signal, the backlash quantity signal generated in the backlash quantity calculating step where the predetermined delay time is set longer than or equal to the length of time from when the control direction detected in the control direction detection step is reversed to when a behavior of the control object is actually reversed; and
a signal adding step of generating a final position command signal by adding the backlash correction signal generated in the delay time calculating step to the position command signal, and
wherein the position control step controls the position of the control object on the basis of the final position command signal generated in the signal adding step.

2. The control method according to claim 1, wherein a length of time less than or equal to half a period of the position command signal formed by a periodic signal is set as the predetermined delay time used in the delay time calculating step.

3. The control method according to claim 1, wherein an actual output of the control object driven on the basis of the position command signal formed by a periodic signal is determined in advance, a phase difference between the position command signal and the actual output is determined, and the determined phase difference is set as the predetermined delay time used in the delay time calculating step.

4. The control method according to claim 1, wherein a control model obtained by modeling the control object is prepared; and
a model output obtained when the position command signal formed by a periodic signal is input to the control model is determined, a phase difference between the position command signal and the model output is determined, and the determined phase difference is set as the predetermined delay time used in the delay time calculating step.

5. The control method according to claim 1, wherein an actual output of the control object driven on the basis of the position command signal formed by a step signal is determined in advance, a time constant based on a response time required for the actual output to reach the position indicated by the position command signal is determined, and the time constant is set as the predetermined delay time used in the delay time calculating step.

6. The control method according to claim 1, wherein the backlash compensation gain is set such that the value of the backlash quantity signal has a magnitude corresponding to an amount of backlash in a speed reducer of the control object.

7. A control device that performs position control of a control object while compensating for backlash in the control object, the control object being configured to move periodically along a movement path, the control device comprising:
- a controller configured to generate a final position command signal by shifting a backlash quantity signal that compensates for the backlash and adding the backlash quantity signal to a position command signal indicating a position of the control object, the controller being configured to perform position control of the control object on the basis of the generated final position command signal wherein the controller includes:
- a position command signal generating unit configured to generate the position command signal;
- a control direction detecting unit configured to detect, on the basis of the position command signal generated by the position command signal generating unit, a control direction for controlling the control object;
- a backlash quantity calculating unit configured to generate, in accordance with the control direction detected by the control direction detecting unit, a backlash quantity signal for compensating for the amount of backlash in the control object, the backlash quantity signal being a stepped control direction signal having a positive or a negative value of 1 multiplied by a backlash compensation gain;
- a delay time calculating unit configured to generate a backlash correction signal by delaying, by a predetermined delay time with respect to the position command signal, the backlash quantity signal generated by the backlash quantity calculating unit where the predetermined delay time is set longer than or equal to the length of time from when the control direction detected in the control direction detection unit is reversed to when a behavior of the control object is actually reversed;
- a signal adding unit configured to generate a final position command signal by adding the backlash correction signal generated by the delay time calculating unit to the position command signal; and
- a position control unit configured to control the position of the control object on the basis of the final position command signal generated by the signal adding unit.

8. The control device according to claim 7, wherein the backlash compensation gain is set such that the value of the backlash quantity signal has a magnitude corresponding to an amount of backlash in a speed reducer of the control object.

* * * * *